United States Patent [19]

Henderson

[11] Patent Number: 5,752,247

[45] Date of Patent: May 12, 1998

[54] LOG ACCESS INTERFACE BETWEEN A NETWORK AND REPOSITORIES

[75] Inventor: Eric A. Henderson, San Jose, Calif.

[73] Assignee: Hewlett-Packard Company, Palo Alto, Calif.

[21] Appl. No.: 688,703

[22] Filed: Jul. 30, 1996

[51] Int. Cl.[6] .................................................. G06F 17/30
[52] U.S. Cl. .......................................... 707/102; 707/203
[58] Field of Search ..................................... 395/60, 61, 62; 707/102, 203

[56] References Cited

U.S. PATENT DOCUMENTS

| | | | |
|---|---|---|---|
| 5,317,742 | 5/1994 | Bapat | 395/680 |
| 5,404,532 | 4/1995 | Allen et al. | 395/186 |
| 5,414,812 | 5/1995 | Filip et al. | 395/614 |
| 5,430,871 | 7/1995 | Jamoussi et al. | 707/202 |
| 5,491,817 | 2/1996 | Gopal et al. | 395/616 |
| 5,530,800 | 6/1996 | Larsson et al. | 395/181 |

*Primary Examiner*—Wayne Amsbury
*Attorney, Agent, or Firm*—Brian R. Short

[57] ABSTRACT

An interface between a telecommunication network and multiple types of repositories. The invention is an apparatus and method for interfacing a CMIP network through a computer system to a repository. The computer system operates a log agent which translates CMIP instructions received by the computer system from the CMIP network to a set of standardized functions. The log agent is the same for all types of repositories. Each type of repository has a unique log access library. The log access library translates the standardized functions of the log agent to a form that can be interpreted by an application specific interface of the repository. Each type of repository has a unique application specific interface. Selection of a plurality of logged events can be determined by the log agent or the log access library.

9 Claims, 5 Drawing Sheets

LOG ACCESS INTERFACE BETWEEN A NETWORK AND REPOSITORIES

FIELD OF INVENTION

This invention relates to a network management system. In particular, it relates to an interface between a telecommunication network and multiple types of repositories.

BACKGROUND

Communications networks, such as telecommunications networks, use network management systems to control and monitor the performance of devices attached to the network. Many such current network management systems use databases for persistent storage of various information relating to the network and devices attached to the network.

FIG. 1 shows an example of a telecommunication network 1. Devices connected to the network 1 generally include telephones 2, 3 and computer systems 4, 5, 6. An example of a computer system is the Hewlett Packard 9000 series computer. The interconnection cable 7 between the devices generally consists of many conductive wires or fiber optic lines. Typically, the computer systems and telephones are located at remote sites. One or more of the computer systems connected to the cable 7 may track events that occur on the network.

The network 1 will generally include switches or multiplexers which complete the connection from one computer system to another computer system, or from one telephone to another telephone. Events on the network can include changes in the status of the switches or multiplexers. Events on the network can also include broken cables or other faults on the network. As previously stated, one or more of the computer systems connected to the network may track and log the events on the network.

Various standards bodies have proposed a protocol called Common Management Information Protocol (CMIP) designed to carry information about operations to be executed and events which have occurred on the network. The CMIP protocol, however, does not provide a mechanism for interfacing with database repositories. The database repositories are controlled by the computer systems connected to the network. Therefore, a software interface operable on a computer system must be developed to allow the computer system to function as an interface between the CMIP network and the repository in which the CMIP network is logging events. The software interface is commonly referred to as a log agent.

Typically, a unique log agent interface must be developed for each type of repository. Examples of repositories include relational data base management systems (RDBMS), flat file management systems and object oriented data base management systems (OODBMS). The repository types can also vary between different repository manufacturers. Each type of repository has a different application specific interface (API). That is, each type of repository is controlled with a different sequence of control signals. The presently existing approach to network repository management requires a unique log agent to exist for each type of repository and each repository manufacturer.

The present approach is undesirable because the differences between the log agents for different types of repositories and different repository manufacturers are extensive. The CMIP is complicated and developing the log agents required to control different types of repositories can be time consuming and difficult.

FIG. 2 shows the prior art structure of an interface between a CMIP network 10 and several repositories 14, 15, 16. Several computers systems 11, 12, 13 function as the interface by operating log agents 17, 18, 19. The computer system 11 operates the log agent 17. The computer system 12 operates the log agent 18. The computer system 13 operates the log agent 19. The log agent 17 provides the interface control of the computer system 11 between the repository 14 and the CMIP network 10. The log agent 18 provides the interface control of the computer system 12 between the repository 15 and the CMIP network 10. The log agent 19 provides the interface control of the computer system 13 between the repository 16 and the CMIP network 10. A unique log agent is required for controlling each of the different types of repositories 14, 15, 16. That is, the log agents 17, 18, 19 are each different. The log agents 17, 18, 19 determine the sequence of the signals generated by the corresponding computer systems 11, 12, 13 which control the repositories 14, 15, 16 based on CMIP commands received by the computer systems 11, 12, 13 from the network 10.

The CMIP of the CMIP network 10 is defined by the CCITT (The International Telegraph and Telephone Consultative Committee) Recommendation X.711. The requirements of the log agents 17, 18, 19 are defined by the CCITT Recommendation X.735. The log agents 17, 18, 19 must interface the CMIP network 10 with the repositories 14, 15, 16 following the Recommendations.

Each repository type has a unique API. Each of the log agents 17, 18, 19 must be designed following the standards set by the CCITT Recommendation X.735, and interface the CMIP network with the unique API of each of the types of repositories.

In order to avoid customization of application, it is desirable to have a standard interface between networks employing the CMIP protocol and the repositories connected to the network. The interface should allow new repository types to be connected to the network without requiring the creation of new log agents.

SUMMARY OF THE INVENTION

The present invention provides a generalized software interface which provides control of an interconnection between a CMIP network and multiple types of repositories. The interface of this invention only requires modification of the interface command structure at the lowest level of abstraction for individual repository types. Therefore, connection of new types of repositories to the CMIP network can be accomplished without modification of the command structure of the log agent controlling the computer system connected between the CMIP network and the repositories.

An embodiment of this invention includes a telecommunications log access apparatus including a CMIP network. A computer system is connected to the CMIP network and receives events to be logged and requests for logged events. The computer system operates a log agent. The log agent processes the network events to be logged and requests for logged events by executing a set of standardized functions. A repository is connected to the computer system for storing the logged events. The repository is one of a plurality of types of repositories and has a unique application specific interface. The computer system operates a log access library. The log access library controls the repository through the application specific interface based upon the functions executed by the log agent.

Other aspects and advantages of the present invention will become apparent from the following detailed description,

DETAILED DESCRIPTION

Figure 1:
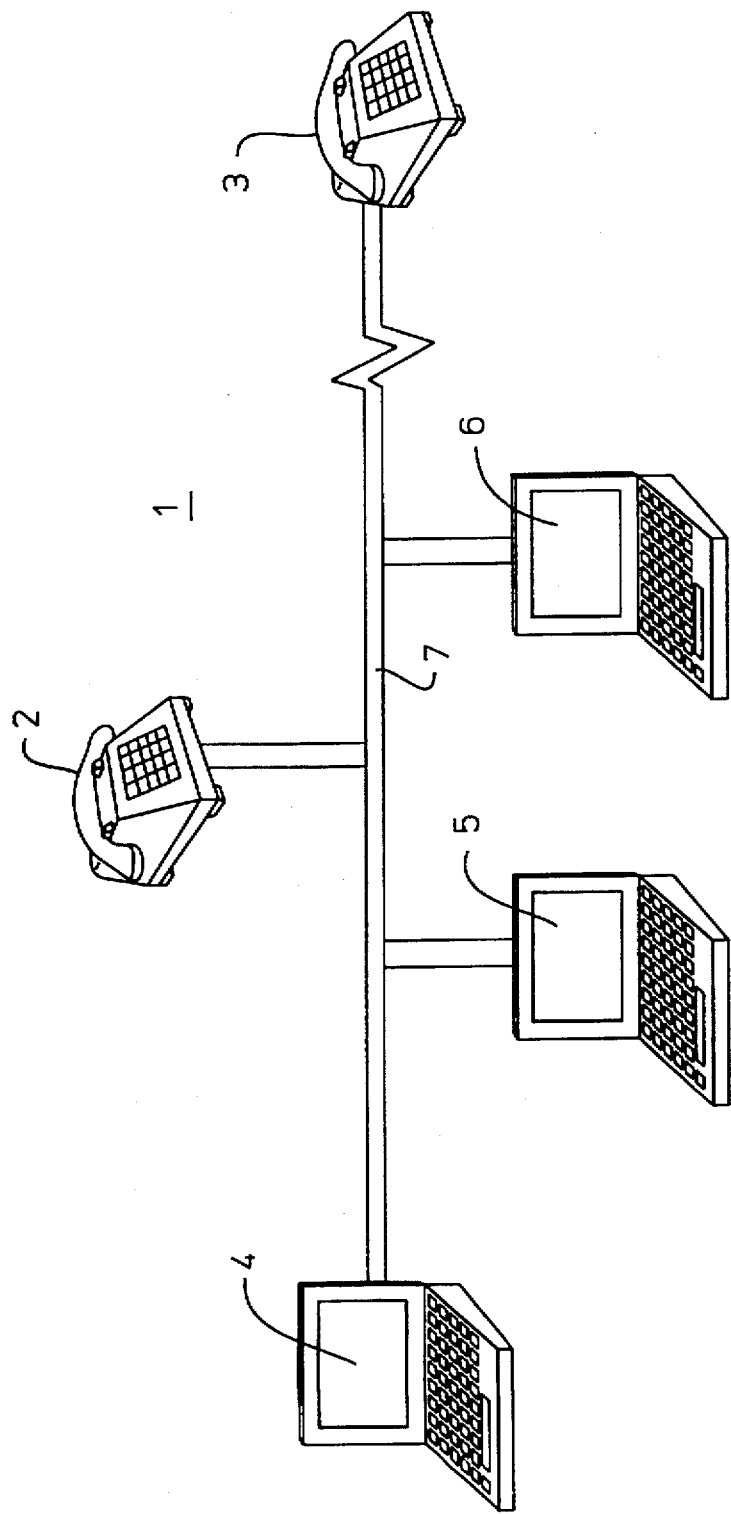
FIG. 1 shows a telecommunications network with devices attached to the network.
Figure 2:
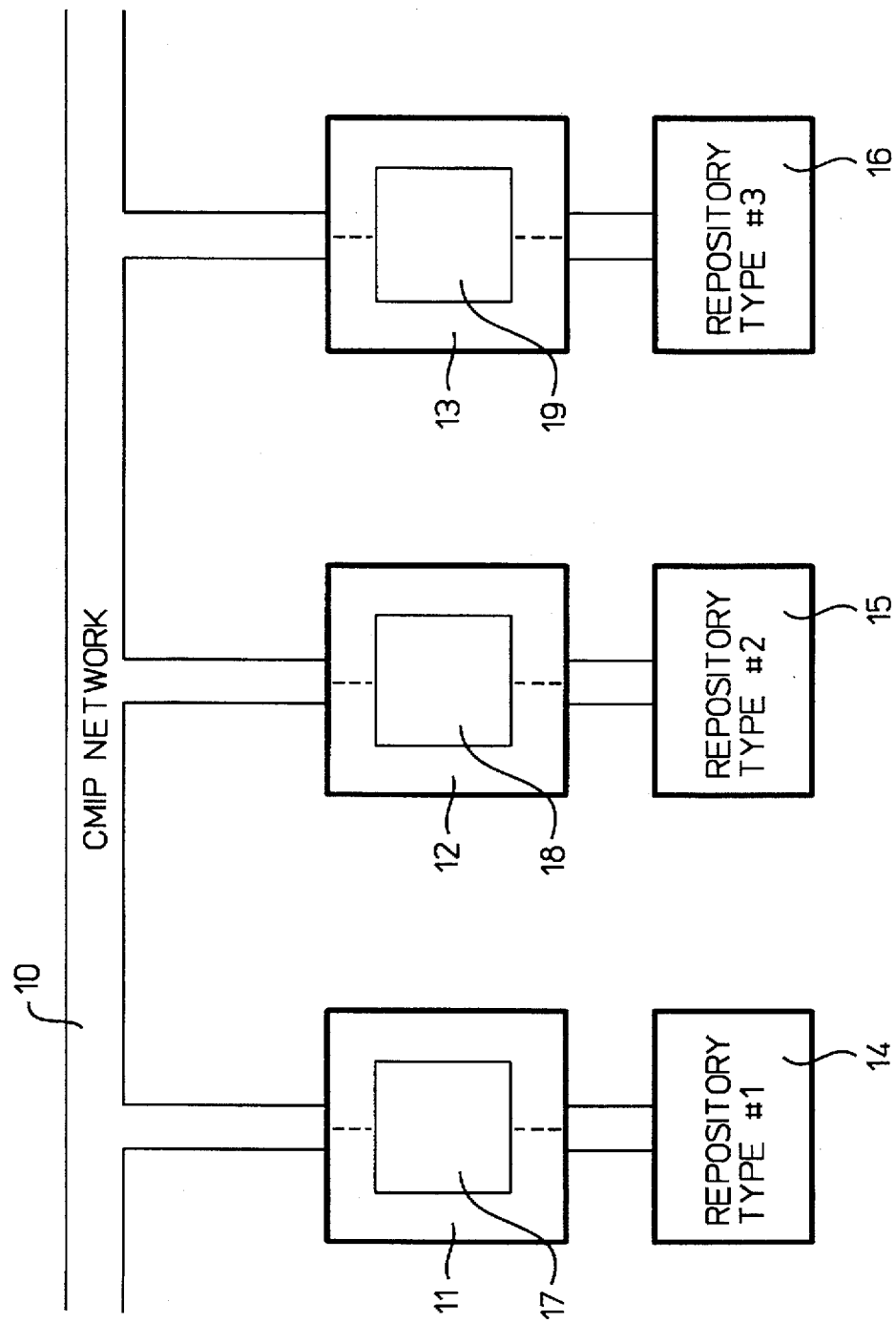
FIG. 2 shows the structure of a prior art interface between a CMIP network and several different types of repositories.

As shown in the drawings for purposes of illustration, the invention is embodied in an apparatus and method for interfacing a CMIP network through a computer system to a repository connected to the computer system. The apparatus includes the computer system operating a log agent and a log access library. The log agent and the log access library transform CMIP commands received from the network by the computer system into a form which can be used to control a repository connected to the computer system. The log agent includes a set number of standard functions. The log access library is a source code implementation of the standard functions of the log agent and is specific to a type of repository. A unique log access library is developed for each type of repository.

The log agent comprises a command structure at the highest level of abstraction. The log access library contains a command structure at the lowest level of abstraction. The introduction of a new repository merely requires a new log access library rather than a completely new and unique log agent. The high level command structure of the log agent remains intact and unchanged with the introduction of new types of repositories. This can significantly reduce the time and effort required to successfully connect a new type of repository to a CMIP network.

Figure 3:
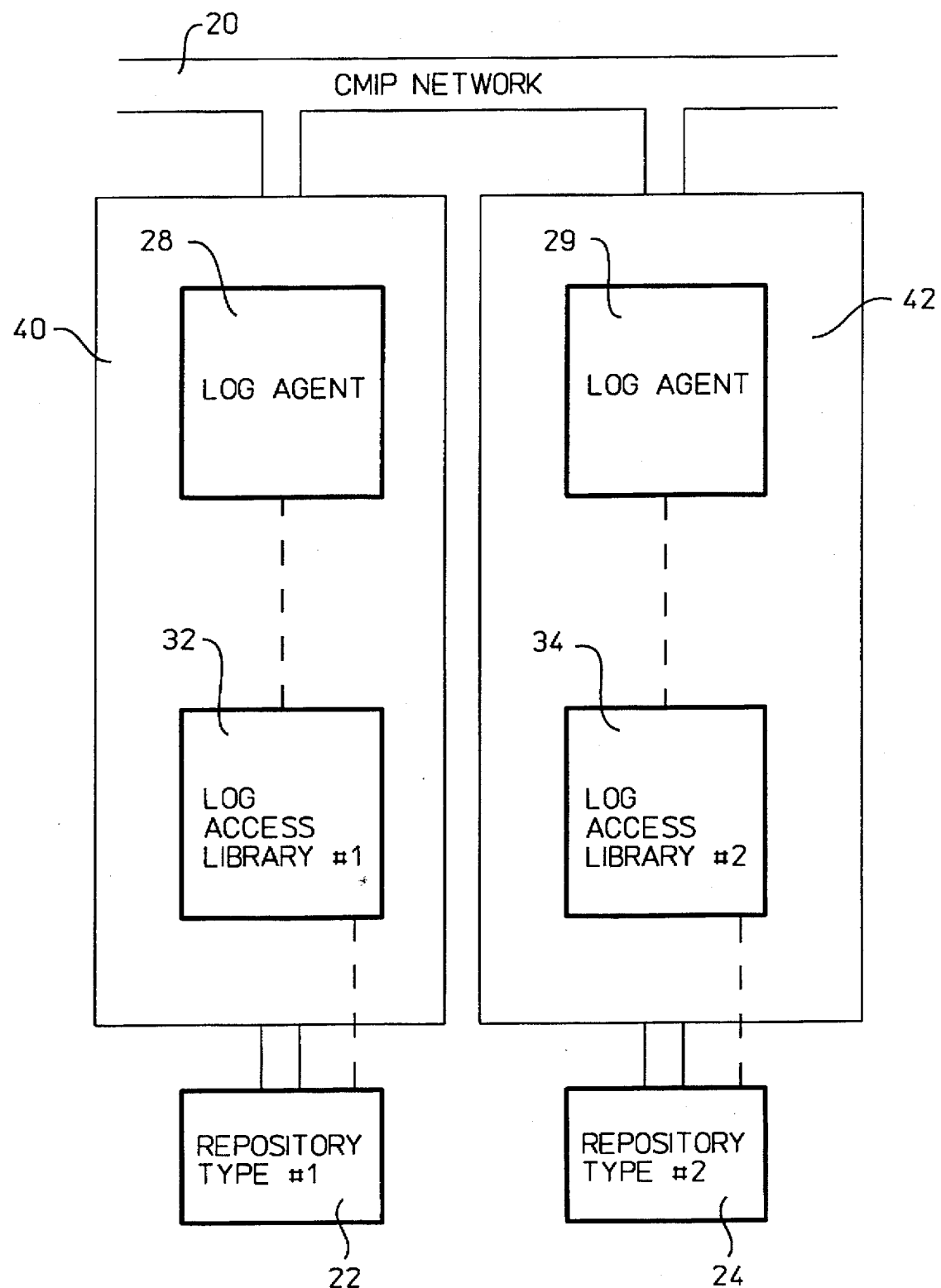
FIG. 3 shows an embodiment of this invention which interfaces a CMIP network and several different types of repositories wherein each repository is associated with a different computer system.

FIG. 3 shows an embodiment of the present invention interfacing a CMIP network with a plurality of repositories. A first computer system 40 is connected to a CMIP network 20 and a repository 22. A second computer system 42 is connected to the CMIP network 20 and a repository 24. The first computer system 40 operates a log access library 32 and a log agent 28. The second computer system 42 operates a log access library 34 and a log agent 29. The log access library 32 controls the repository 22, and the log access library 34 controls the repository 24. The log agent 28 of both the first computer system 40 and the log agent 29 of the second computer system 42 are identical. The connection of a third computer system having a different type of repository than the repositories 22, 24 merely requires the development of a new log access library. The third computer system can use the log agent 28 used in the first computer system 40 or the log agent 29 used in the second computer system 42.

The log agent 28 contains a standard structure as defined by the CCITT X.735 Recommendation. The computer system receives the CMIP commands which includes GET, SET, CREATE, DELETE, ACTION and EVENT, and the log agent translates the commands into a sequence of functions interpretable by the log access libraries 32, 34. As previously stated, the log agent is identical for all types of repositories.

For an embodiment of this invention, the functions which can be interpreted by the log access libraries include:

lal_connect, lal_disconnect, lal_create_repository, lal_delete_repository, lal_create_log_record, lal_sizeof_log_record, lal_retrieve_log_record, lal_delete_log_records, lal_start_log_retrieve, lal_start_log_remove, lal_next_log_record, lal_free_log_record, lal_remove_log_record, lal_get_log_status, lal_get_logfull, lal_set_logfull.

The functions lal_connect and lal_disconnect, connect and disconnect a specified database repository to a network through the log agent. The functions lal_create_repository and lal_delete_repository, create and delete a log within the repository in which events are stored. The function lal_create_log_record stores an event as a log record in an existing log. The function lal_sizeof_log_record determines how much space in a repository is required for storing a given event. The function lal_retrieve_log_record accesses a log record. The function lal_delete_log_records synchronously deletes a selection of log records from a log.

The functions lal_start_log_retrieve, lal_next_log_record and lal_free_log_record can be used to retrieve a multiple number of selected log records. The function lal_start_log_retrieve specifies a filter that determines which selection of log records are accessed upon repeated execution of the lal_next_log_record function. Execution of the function lal_start_log_retrieve generates a response indicating whether the accessed repository has the capability to perform the desired level of filtering. If the repository cannot perform the desired level of filtering, then the repository will return all records and the log agent performs the desired level of filtering on all of the returned records. This scenario allows optimization of the required filtering. A repository is more efficient than a log agent in filtering records. However, if the accessed repository cannot perform the desired filtering, then the log agent must perform the required filtering of the log records.

Execution of the lal_start_log_retrieve function fills program memory with log records. The lal_free_log_record function serves the purpose of indicating that the previously retrieved log records no longer need to be stored in program memory. The execution of the lal_free_log_record function frees program memory for other subsequent executions of the lal_start_log_retrieve function.

The functions lal_start_log_remove, lal_next_log_record and lal_remove_log_record can be used to asynchronously delete a multiple number of selected log records. The function lal_start_log_remove specifies a filter that determines which selection of log records should be deleted. Execution of the lal_start_log_remove generates a response indicating whether the accessed repository has the capability to perform the desired level of filtering. If the desired filtering is too complicated for the accessed repository, then the log agent repeatedly executes the lal_next_log_record function which retrieves all records. The lal_remove_log_record is then executed to select the records to be deleted.

The function lal_get_log_status can be used to determine the size of a log and the number of log records in a log. The functions lal_get_log_full and lal_set_logfull determine and specify when a log is full.

The computer systems 40, 42 receive CMIP commands from the CMIP network 20. The log agents 28, 29 transform the CMIP commands received by the computer systems 40, 42 into the set of standard functions. The log access libraries 32, 34 transform through a source code implementation the standard functions of the log agent to the application specific interface (API) of the repositories 22, 24. The command structure of the log access libraries is at the lowest level of abstraction. Therefore, none of the higher level commands of the log agent 28 needs to be modified to accommodate new types of repositories.

Each type of repository has its own unique API. For an embodiment of this invention, the log access library consists of C programming code which translates the functions of the log agent 28 to a form interpretable by the API of the repository. The functions of the log agent 28 are programmed within the log access libraries to carry out the defined functions. A unique log access library is designed for each unique API corresponding to each type of repository. The API for each repository is defined by the manufacturer of the repository.

Figure 4:
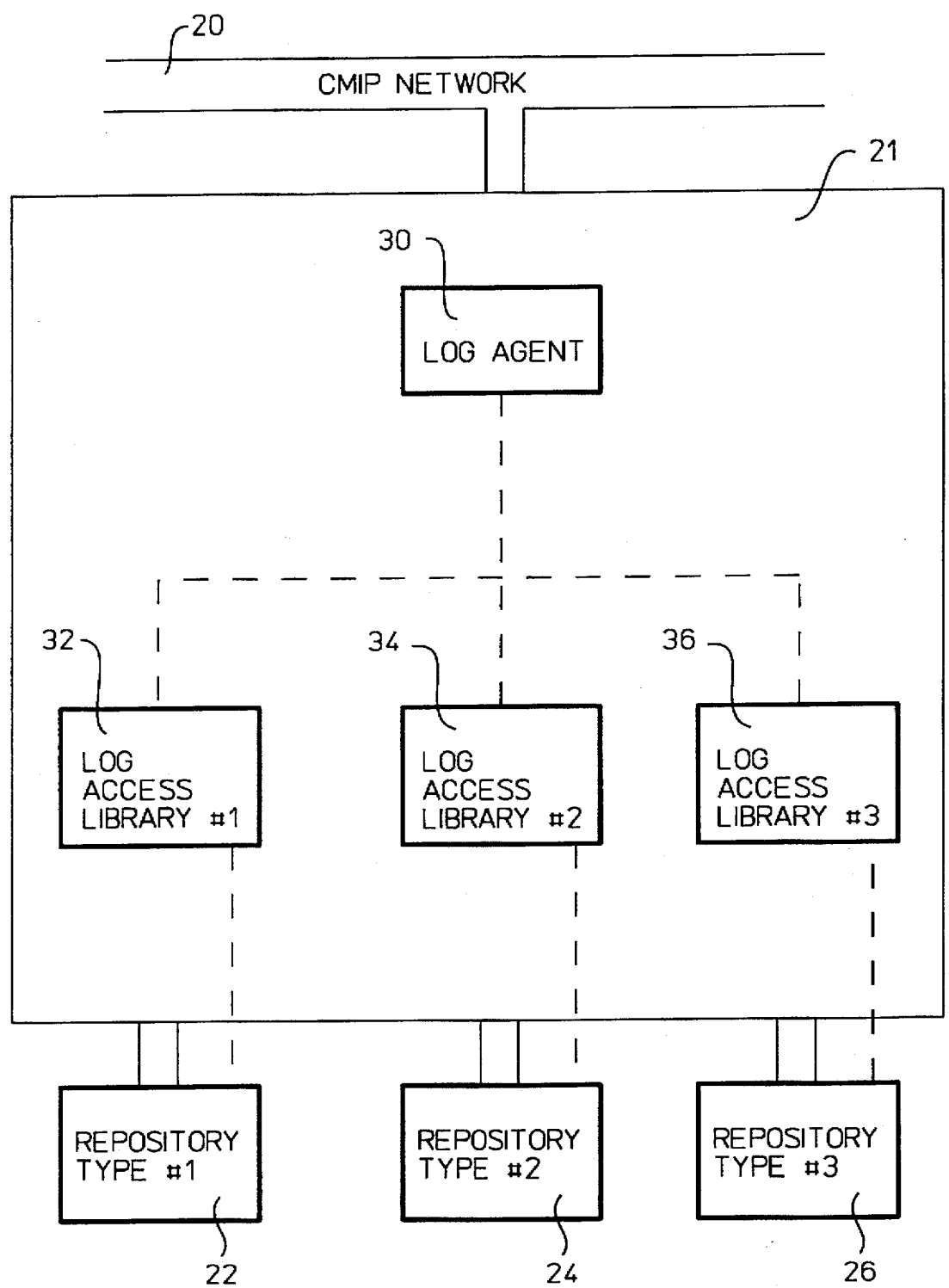
FIG. 4 shows the another embodiment of this invention which interfaces a CMIP network with several different types of repositories wherein several repositories are associated with a single computer system.

FIG. 4 shows another embodiment of the present invention interfacing a CMIP network 20 with a plurality of repositories 22, 24, 26. The CMIP network 20 is interfaced with the plurality of repositories 22, 24, 26 through a computer system 21. The computer system operates a log agent 28 and a plurality of log access libraries 32, 34, 36. The repositories 22, 24, 26 are each different types of repositories.

For this invention, a single log agent 30 can be used for controlling the computer system which interfaces the CMIP network 20 with the plurality of repositories 22, 24, 26. The log agent 30 comprises the sixteen previously discussed functions which can be executed to carry out the commands received from the CMIP network 20. That is, the log agent 30 is identical to the log agents 28, 29 of FIG. 3. The log access libraries 32, 34, 36 are source code implementations of the sixteen pre-defined functions of the log agent 30. The repository types 22, 24, 26 each have a corresponding unique log access library 32, 34, 36. That is, repository 22 corresponds with log access library 32, repository 24 corresponds with log access library 34, and repository 26 corresponds with log access library 36.

Figure 5:
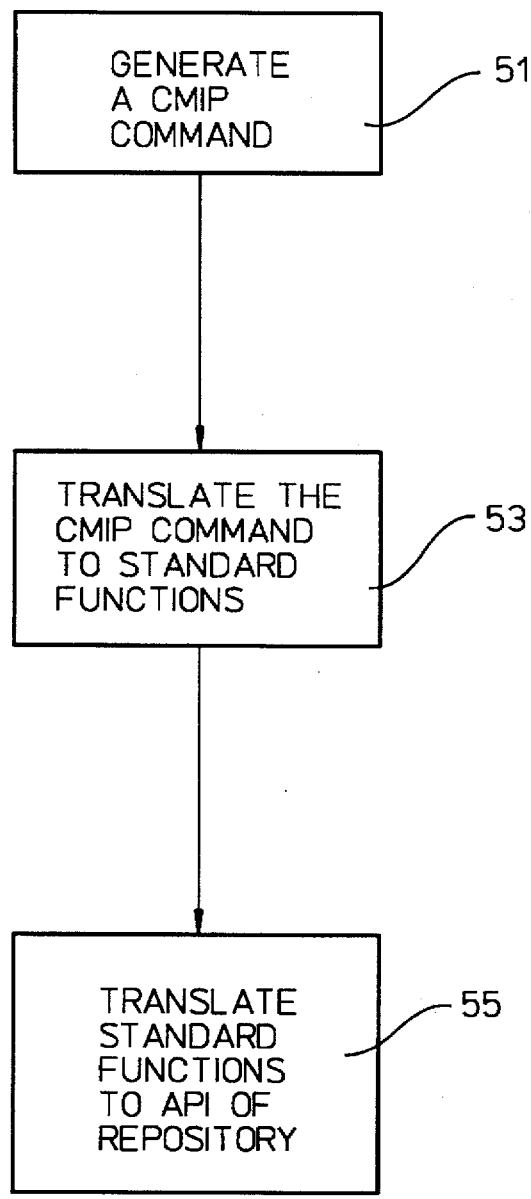
FIG. 5 is a flow chart that shows a method of logging telecommunications events occurring on a CMIP network to a repository controlled by a computer system connected to the CMIP network.

FIG. 5 is a flow chart that shows a method of logging telecommunications events occurring on a CMIP network to a repository controlled by a computer system connected to the CMIP network. The first step 51 of the method includes generating a CMIP command instructing the logging of an event to a repository. The second step 53 includes translating the CMIP command into a combination of standardized functions, the translation being performed by a CCITT X.735 standardized log agent. Finally, the third step 55 includes translating the combination of standardized functions into a form which can be interpreted by an application programming interface of the repository, the translation being performed by a log access library.

Although specific embodiments of the invention have been described and illustrated, the invention is not to be limited to the specific forms or arrangements of parts so described and illustrated. The invention is limited only by the claims.

What is claimed is:

1. A telecommunications log access apparatus comprising:
   a CMIP network;
   a computer system connected to the CMIP network, the computer system receiving events to be logged and requests for logged events;
   a log agent operating on the computer system, the log agent processing the network events to be logged and requests for logged events by executing a set of standardized functions;
   a plurality of repository types connected to the computer system for storing the logged events, each repository type having a corresponding application specific interface; and
   a plurality of log access libraries operating on the computer system, each log access library controlling a corresponding repository through the corresponding application specific interface based upon the functions executed by the log agent.

2. The telecommunications log access apparatus as recited in claim 1, wherein the log access library controls a selection of a plurality of events to be logged.

3. The telecommunications log access apparatus as recited in claim 2, wherein the selection of a plurality of events to be logged is performed by the log agent when the log access library does not have the capability of performing the desired selection.

4. The telecommunications log access apparatus as recited in claim 1, further comprising a plurality of computer systems connected to the CMIP network.

5. The telecommunications log access apparatus as recited in claim 1, wherein the repository comprises a flat file.

6. The telecommunications log access apparatus as recited in claim 1, wherein the repository comprises a relational data base.

7. The telecommunications log access apparatus as recited in claim 1, wherein the repository comprises an object oriented data base.

8. A method of logging telecommunications events occurring on a CMIP network to a repository controlled by a computer system connected to the CMIP network, the method comprising the steps of:
   generating a CMIP command instructing the logging of an event to a repository;
   translating the CMIP command into a combination of standardized functions, the translation being performed by a CCITT X.735 standardized log agent;
   translating the combination of standardized functions into a form which can be interpreted by an application programming interface of the repository, the translation being performed by a log access library.

9. A telecommunications log access apparatus comprising:
   a CMIP network;
   a computer system connected to the CMIP network, the computer system receiving events to be logged and requests for logged events;

a plurality of similar log agents operating on the computer system, each log agent processing the network events to be logged and requests for logged events by executing a set of standardized functions;

a plurality of repository types connected to the computer system for storing the logged events, each repository type having an application specific interface; and a plurality of log access libraries operating on the computer system, each log access library controlling a corresponding repository through a corresponding application specific interface based upon the functions executed by a corresponding log agent.

* * * * *